March 19, 1963  T. HOOKER  3,081,909
APPARATUS AND PROCESS FOR CONTINUOUS PROPORTIONING
OF MULTI-COMPONENT MIXTURES
Filed June 9, 1959
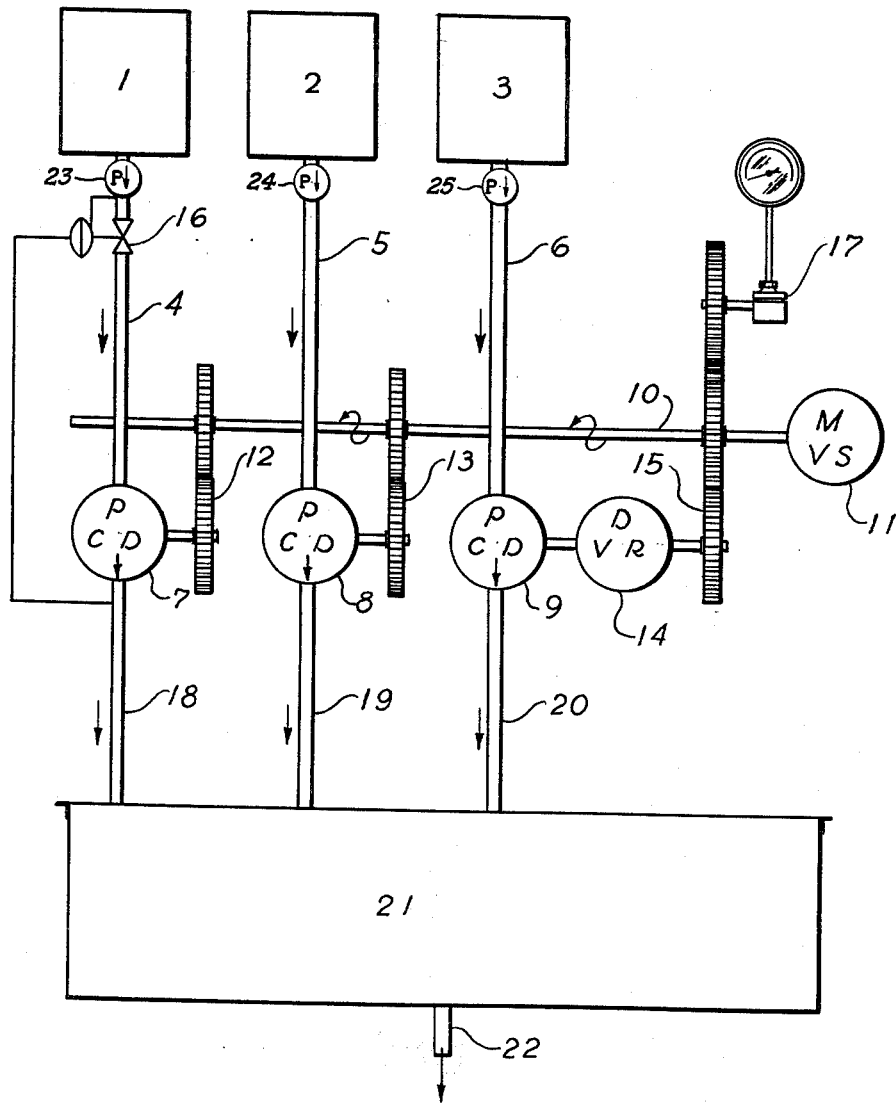

United States Patent Office 3,081,909
Patented Mar. 19, 1963

3,081,909
APPARATUS AND PROCESS FOR CONTINUOUS PROPORTIONING OF MULTI-COMPONENT MIXTURES
Thomas Hooker, Youngstown, N.Y., assignor to Hooker Chemical Corporation, Niagara Falls, N.Y., a corporation of New York
Filed June 9, 1959, Ser. No. 819,079
4 Claims. (Cl. 222—1)

This invention relates to an apparatus and process for varying the total delivery rate of multi-component mixtures while maintaining the ratio between components.

Many applications require that two or more components be continuously fed at definite proportions to a reactor or mixing device, for example, in the production of plastics such as polyurethane foams, polyesters, epoxy plastics or coating materials. When application conditions vary, it is frequently desirable to be able to independently vary the total delivery rate of all components without affecting the ratio of one component to another. This is desirable in order to control such factors as gel time or viscosity. It is highly desirable that this be accomplished simply and inexpensively without utilizing excessive equipment.

Commercially available multi-component metering systems usually employ independent variable speed drives for each component. These drives are individually adjusted and calibrated to the desired proportions. A change in total delivery rate requires readjustment and recalibration of each stream. This is inconvenient, wastes material and is time consuming.

It is, therefore, an object of the present invention to overcome the aforementioned disadvantages of the prior art by providing an apparatus and process for simply and effectively varying the total delivery rate of a multi-component mixture while maintaining the ratio between components.

It is a further object of the present invention to provide an apparatus in which the ratio between components may be simply and effectively changed when desired.

Further objects and advantages of the present invention will appear hereinafter.

In accordance with the apparatus and process of the present invention, it has been found that total delivery rate of a multi-component mixture may be varied, while maintaining the ratio between components, by feeding each component to separate constant delivery pump, driving each pump at appropriate speed ratio from a common shaft activated by a prime mover or variable speed motor at controlled variable speed, and pumping each component in the desired ratio at any speed of the variable speed shaft.

In order that the invention may be more easily understood, it will be discussed with reference to the attached drawing.

The components of the multi-component system are stored in separate reservoirs 1, 2, and 3. By multi-component systems, this invention contemplates any system requiring the use of two or more components. In the attached drawing, a three-component system has been selected as being illustrative. Each component is fed by separate feed lines 4, 5, and 6 to separate constant delivery pumps 7, 8, and 9, respectively. It is necessary to use a constant delivery type pump, i.e., where every stroke or revolution of the pump sends out a given amount of material. The pumps can be gear pumps, reciprocating pumps, or other positive displacement pumps, so selected that within the desired delivery range, the quantity delivered is directly proportional to input speed, i.e., cavitation or shaft leakage must not occur and slippage must be within proportional tolerance for the chemical system. It is sometimes convenient to utilize auxiliary transfer pumps such as pumps 23, 24, and 25 to supply the components to the metering pump suction connections at essentially constant pressures.

Each pump is driven by a common variable speed shaft 10 driven at controlled variable speed by a prime mover or variable speed motor 11 through change gears 12 and 13 on the individual pump drives so that the ratio between components may be varied (preset) at any total delivery rate or at any given drive speed. An auxiliary variable ratio drive 14 geared to variable speed shaft 10 by gear 15 may be utilized for readily varying the ratio of that component if ratio changes are frequent. Greater than one auxiliary variable ratio drive may be used if desired. The variable speed drive can be electrically, mechanically, hydraulically, or pneumatically operated, although the latter two are preferred for reasons of compactness, light weight, and easy controllability.

Where slippage is a problem, as with low viscosity fluids, a differential pressure controller 16 may be employed to limit the differential pressure across the metering pump to a low value in order to minimize slippage. A tachometer 17, or other similar means, may be employed to indicate motor speed or revolutions and thereby total delivery rate.

The multi-components are then pumped by feed lines 18, 19, and 20 to reactor or mixer 21. After reaction, the mixture is discharged through mixed fluid exit 22.

The present invention is especially suitable for the production of polyurethane foams wherein a resin component and an isocyanate component must be fed in stoichiometric proportions and a third stream containing the blowing agent and/or additives is often employed to control foam density. Adjustment of the proportion of the third component is often required to suit mould size, configuration and/or temperature and cure conditions. The gel time and viscosity of the prefoam, which affect its handling characteristics, and the structure and physical characteristics of the finished foam, are controlled to some extent by the residence time in the mixer, which varies inversely with total prefoam rate. Easy adjustment of prefoam rate permits control over these important variables and gives adaptability to variable mould filling conditions. The use of an air motor drive in these systems permits ready speed adjustment by throttling the air flow and avoids the necessity for relief valves by limiting the available torque to a value which would not damage pumps or equipment if pump gears jammed or if any pump discharge line became blocked.

Although the limitations of the present invention have been described, similar modifications and variations will suggest themselves to persons skilled in the art upon reading this disclosure. These are intended to be comprehended within the spirit of this invention.

I claim:

1. An apparatus for establishing a desired ratio of components, and for pumping a desired total delivery rate of a multi-component mixture while maintaining the said ratio between said components comprising in combination: a variable speed prime mover, a shaft driven by said prime mover, a separate positive delivery pump for each component, change gear transmissions between at least two of said pumps and said shaft for establishing the desired ratio between the components transferred by these pumps, at any total delivery rate, an auxiliary variable ratio drive between said shaft and at least one pump for readily and separately varying the relative delivery of at least one component at any total delivery rate, a separate reservoir for each component, a separate feed line extending from each reservoir to each pump, and a common delivery means for all of said pumps.

2. An apparatus for establishing a desired ratio of components, and for pumping a desired total delivery rate of a three-component mixture while maintaining the said ratio between said components comprising in combination: a variable speed prime mover, a shaft driven by said prime mover, a separate positive delivery pump for each component, change gear transmissions between two of said pumps and said shaft for establishing the desired ratio between the two components transferred by these pumps at any total delivery rate, an auxiliary variable ratio drive between said shaft and the third pump for readily and separately varying the relative delivery of that component at any total delivery rate, a separate reservoir for each component, a separate feed line extending from each reservoir to each pump, an auxiliary transfer pump on each feed-line to supply each component to each positive delivery pump, and a common delivery means for all of said pumps.

3. A process for establishing a desired ratio of components, and for pumping a desired total delivery rate of a multi-component mixture while maintaining the said ratio between said components comprising: feeding each component from a separate reservoir to a separate positive delivery pump, driving each positive delivery pump from a common drive shaft activated by a prime mover, adjusting the delivery rate of at least two of said pumps to provide the desired ratio of the components transferred by these pumps, separately adjusting the delivery rate of at least one pump to provide said desired ratio of components, and driving said primer mover at the speed which delivers said desired total delivery rate.

4. A process for establishing a desired ratio of components, and for pumping a desired total delivery rate of a three-component mixture while maintaining the ratio between components comprising: feeding each component from a separate reservoir to a separate positive delivery pump by means of an auxiliary transfer pump, driving each positive delivery pump from a common shaft activated by a prime mover, adjusting the delivery rate of two of said pumps to provide the desired ratio of the two components transferred by these pumps, separately adjusting the delivery rate of the third pump to provide said desired ratio of components, and driving said prime mover at the speed which delivers said desired total delivery rate.

References Cited in the file of this patent

UNITED STATES PATENTS

| | | |
|---|---|---|
| 1,964,028 | Boynton et al. | June 26, 1934 |
| 2,051,932 | Alexander | Aug. 25, 1936 |
| 2,737,978 | Eberz | Mar. 13, 1956 |
| 2,898,002 | Blanchet et al. | Aug. 4, 1959 |